US009212581B2

(12) United States Patent
Liljestrand et al.

(10) Patent No.: US 9,212,581 B2
(45) Date of Patent: Dec. 15, 2015

(54) METHOD AND DEVICE PERTAINING TO COOLING OF DOSING UNITS OF SCR SYSTEMS

(75) Inventors: Andreas Liljestrand, Södertälje (SE); Per Bremberg, Södertälje (SE); Daniel Arvidsson, Värmdö (SE)

(73) Assignee: SCANIA CV AB (SE)

( * ) Notice: Subject to any disclaimer, the term of this patent is extended or adjusted under 35 U.S.C. 154(b) by 354 days.

(21) Appl. No.: 13/704,724

(22) PCT Filed: Jun. 17, 2011

(86) PCT No.: PCT/SE2011/050773
§ 371 (c)(1),
(2), (4) Date: Jan. 23, 2013

(87) PCT Pub. No.: WO2011/162684
PCT Pub. Date: Dec. 29, 2011

(65) Prior Publication Data
US 2013/0133310 A1     May 30, 2013

(30) Foreign Application Priority Data
Jun. 21, 2010    (SE) ....................................... 1050653

(51) Int. Cl.
*F01N 3/00*      (2006.01)
*F01N 3/10*      (2006.01)
*F01N 3/20*      (2006.01)

(52) U.S. Cl.
CPC ...... *F01N 3/10* (2013.01); *F01N 3/208* (2013.01); *F01N 2610/10* (2013.01); *F01N 2610/11* (2013.01); *F01N 2610/1453* (2013.01); *Y02T 10/24* (2013.01)

(58) Field of Classification Search
CPC ....... F01N 3/10; F01N 3/208; F01N 2610/10; F01N 2610/1453; F01N 2610/11; Y02T 10/24
USPC ..................... 60/274, 286, 295, 298, 301, 303
See application file for complete search history.

(56) References Cited

U.S. PATENT DOCUMENTS 5,522,218 A *   6/1996   Lane et al. ....................... 60/274
6,279,603 B1 *   8/2001   Czarnik et al. ................. 137/339

(Continued)

FOREIGN PATENT DOCUMENTS

DE    10 2008 001 092 A1    11/2008
WO      WO 00/21881      4/2000

OTHER PUBLICATIONS

International Search Report dated Oct. 5, 2011 issued in corresponding international application No. PCT/SE2011/050773.

*Primary Examiner* — Jesse Bogue
*Assistant Examiner* — Diem Tran
(74) *Attorney, Agent, or Firm* — Ostrolenk Faber LLP

(57) ABSTRACT

A method pertaining to an SCR system which includes a dosing unit (250) to supply reducing agent to an exhaust duct (240) for exhaust cleaning, and a container for reducing agent: the steps of determining (s320) a cooling requirement of the dosing unit (250) and choosing (s340) a limit level for reducing agent in the container (205) on the basis of the cooling requirement. A computer program product containing program code (P) implements a method according to the invention. A device of an SCR system includes a dosing unit (250) to supply reducing agent to an exhaust duct (240) for exhaust cleaning. A motor vehicle (100) is equipped with the device.

21 Claims, 3 Drawing Sheets

(56) References Cited

U.S. PATENT DOCUMENTS 6,814,303 B2 * 11/2004 Edgar et al. .................. 239/128
8,056,326 B2 * 11/2011 Cox et al. ...................... 60/295
8,499,739 B2 * 8/2013 Cox et al. ..................... 123/304

2004/0098978 A1 5/2004 Tarabulski et al.
2006/0016176 A1 * 1/2006 Hilden et al. ................. 60/286
2009/0084095 A1 4/2009 Dalton
2009/0255232 A1 10/2009 Barcin

* cited by examiner

METHOD AND DEVICE PERTAINING TO COOLING OF DOSING UNITS OF SCR SYSTEMS

CROSS-REFERENCE TO RELATED APPLICATIONS

The present application is a 35 U.S.C. §§371 national phase conversion of PCT/SE2011/050773, filed Jun. 17, 2011, which claims priority of Swedish Application No. 1050653-3, filed Jun. 21, 2010, the contents of which are incorporated by reference herein. The PCT International Application was published in the English language.

TECHNICAL FIELD

The present invention relates to a method pertaining to SCR systems which comprise a dosing unit to supply a reducing agent to an exhaust duct for exhaust cleaning, and a container for reducing agent. The invention relates also to a computer program product containing program code for a computer for implementing a method according to the invention. The invention relates also to a device of an SCR system which comprises a dosing unit to supply a reducing agent to an exhaust duct for exhaust cleaning, and a motor vehicle which is equipped with the device.

BACKGROUND

Vehicles today use, for example, urea as reductant in SCR (selective catalytic reduction) systems which comprise an SCR catalyst, in which catalyst said reductant and NOx gas can react and be converted to nitrogen gas and water. Various types of reductants may be used in SCR systems. AdBlue is an example of a commonly used reductant.

One type of SCR system comprises a container for a reductant. The SCR system may also have a pump adapted to drawing said reductant from the container via a suction hose and to supplying it via a pressure hose to a dosing unit situated adjacent to an exhaust system of the vehicle, e.g. adjacent to an exhaust pipe of the exhaust system. The dosing unit is adapted to injecting a necessary amount of reductant into the exhaust pipe upstream of the SCR catalyst according to operating routines stored in a control unit of the vehicle. To make it easier to regulate the pressure when no or only small amounts are being dosed, the system also comprises a return hose which runs back from a pressure side of the system to the container. This configuration makes it possible to cool the dosing unit by means of the reductant which, during cooling, flows from the container via the pump and the dosing unit and back to the container. The dosing unit is thus provided with active cooling. The return flow from the dosing valve to the container may be substantially constant.

In today's vehicles, cooling of the dosing unit is assured by having a rather high least permissible volume of reducing agent in the container. Cooling of the dosing unit may thus be assured even during extreme outdoor temperatures. A disadvantage of this technique is that a relatively large proportion of the reducing agent held in the container cannot be used for dosing into the exhaust pipe for use in the SCR catalyst. This means that in practice said reducing agent acts to some extent as ballast, resulting in a number of adverse effects, e.g. that the vehicle's total load capacity is less than it might be, both in weight and in volume.

WO 00/21881 describes a temperature-controlled system for injecting urea solution into an exhaust system whereby the urea solution is pumped from a tank in sufficient mass flow not only to make sufficient injection possible but also to cool an associated injector to a sufficiently low temperature. The coolant urea solution may be led back to the tank. The system comprises volume meters and temperature sensors in the tank. When deviations occur, the system can halt the circulation of the urea solution. This entails the disadvantage that an undesirable temperature may occur at the injector.

There is thus a need to improve current SCR systems in order to reduce or eliminate the above disadvantages.

SUMMARY OF THE INVENTION

An object of the present invention is to propose a novel and advantageous method for improving the performance of an SCR system.

An object of the present invention is to propose a novel and advantageous method for improving the performance of an SCR system whereby a sufficient volume of reducing agent for dosing is optimised.

Another object of the invention is to propose a novel and advantageous device of an SCR system and a novel and advantageous computer program for improving the performance of an SCR system.

Another object of the invention is to propose a novel and advantageous device of an SCR system and a novel and advantageous computer program for improving the performance of an SCR system whereby a sufficient volume of reducing agent for dosing is optimised.

An object of the present invention is to propose a method and a device pertaining to an SCR system which result in reduced risk of undesirable functional degradation of components of the SCR system and/or reduced risk of obstruction of components, e.g. a dosing unit, of the SCR system with respect to a reducing agent.

A further object of the invention is to propose an alternative method pertaining to an SCR system and an alternative computer program pertaining to an SCR system, and an alternative device of an SCR system.

These objects are achieved with a method pertaining to SCR systems which comprise a dosing unit to supply reducing agent to an exhaust duct for exhaust cleaning, according to the disclosure herein.

An aspect of the invention proposes a method pertaining to SCR systems which comprise a dosing unit to supply reducing agent to an exhaust duct for exhaust cleaning, and a container for reducing agent, comprising the step of choosing a limit level for reducing agent in said container. The method comprises also the steps of determining a cooling requirement of said dosing unit, and choosing a limit level for reducing agent in said container on the basis of said cooling requirement.

To ensure that the reducing agent in the container does not become too warm, and to ensure effective cooling of the dosing unit, the innovative method proposed involves choosing a sufficient volume of reducing agent. This makes it possible to achieve optimisation of a smallest desired volume of reducing agent.

An aspect of the present invention allows a variable smallest permissible volume of reducing agent in the container, which volume is determined on the basis of an actual cooling requirement of the dosing unit.

An advantage of the present invention is that a volume of reducing agent available for dosing can be maximised.

In cases where the SCR system is fitted on a motor vehicle, load capacity can with advantage be increased in both weight and volume.

Another advantage of the present invention is that the volume of the container can in certain cases be optimised, e.g. made smaller, potentially releasing space for other components of the SCR system or other systems fitted adjacent to the SCR system.

Another advantage of the present invention is that there is scope for choice of residual volume strategy on the basis of a region or climate in which the SCR system is normally operated.

An aspect of the invention makes it possible to lower temporarily a limit value level, indicating a smallest desirable volume of reducing agent in the container, if this is deemed necessary in order, for example, to avoid automatic reduction of available torque of an engine of the SCR system.

The method may comprise the steps of:
determining a prevailing temperature of said reducing agent in said container, and
determining said cooling requirement of said dosing unit on the basis of said determined prevailing temperature of said reducing agent in said container.

This affords the advantage of being able to determine said cooling requirement by means of a simple calculation model, resulting in a method with little computational complexity.

The method may comprise the steps of:
determining a prevailing temperature of said reducing agent in said dosing unit, and
determining said cooling requirement of said dosing unit on the basis of said determined prevailing temperature of said reducing agent in said dosing unit.

This affords the advantage of being able to determine said cooling requirement by means of a simple calculation model, resulting in a method with little computational complexity.

The method may comprise the step of:
determining said cooling requirement of said dosing unit on the basis of at least one determined parameter chosen from among the following: prevailing ambient temperature of said container, prevailing operating power of an engine of said SCR system, prevailing temperature of exhaust gases in said exhaust duct, and cumulative amount of reducing agent dosed. This may result in an improved basis for determining said cooling requirement with greater accuracy.

The method may comprise the step of:
choosing said limit level for reducing agent in said container within a predetermined range. Introducing limitations upon the choice of said limit level results in a more reliable method for reducing the risk of undesirable obstruction of the dosing unit. A lower limit level for reducing agent in the container may correspond to, for example, 3 or 5 litres of reducing agent in the container. An upper limit level for reducing agent in the container may correspond to a volume which is somewhat less than a total volume of the container, e.g. 90% of the total volume.

The method may comprise the step of:
continuously determining a cooling requirement of said dosing unit, and
choosing an updated limit level for reducing agent in said container on the basis of said continuously determined cooling requirement. The result is a method which responds quickly to changing situations, e.g. during operation of the SCR system with greatly varying load.

The method may comprise the step of:
choosing an initial limit level for reducing agent in a container on the basis of the performance of said SCR system and/or supposed future operation of the SCR system, e.g. as regards estimated average load upon an engine of the SCR system and estimated maximum load upon the engine of the SCR system. This affords the advantage of resulting in a method which adapts said limit level in the container more quickly and is also a more robust method.

Said reducing agent may be a urea-based reducing agent. Said limit level for reducing agent in said container corresponds to a smallest desirable volume of reducing agent in said container.

The method is easy to implement in existing motor vehicles. Software pertaining to SCR systems which comprise a dosing unit to supply reducing agent to an exhaust duct for exhaust cleaning according to the invention may be installed in a control unit of the vehicle during the manufacture of the vehicle. A purchaser of the vehicle may thus have the possibility of selecting the function of the method as an option. Alternatively, software which comprises program code for applying the innovative method pertaining to SCR systems which comprise a dosing unit to supply reducing agent to an exhaust duct for exhaust cleaning, and a container for reducing agent, may be installed in a control unit of the vehicle on the occasion of upgrading at a service station, in which case the software may be loaded into a memory in the control unit. Implementing the innovative method is therefore cost-effective, particularly since no further sensors or components need be installed in the vehicle. Relevant hardware is currently already provided in the vehicle. The invention therefore represents a cost-effective solution to the problems indicated above.

Software comprising program code pertaining to SCR systems which comprise a dosing unit to supply reducing agent to an exhaust duct for exhaust cleaning is easy to update or replace. Moreover, different parts of the software containing program code pertaining to SCR systems which comprise a dosing unit to supply reducing agent to an exhaust duct for exhaust cleaning may be replaced independently of one another. This modular configuration is advantageous from a maintenance perspective.

An aspect of the invention proposes a device of SCR systems which comprises a dosing unit to supply reducing agent to an exhaust duct for exhaust cleaning, and a container for reducing agent, comprising means for choosing a limit level for reducing agent in said container. The device comprises also means for determining a cooling requirement of said dosing unit, and means for choosing a limit level for reducing agent in said container on the basis of said cooling requirement.

The device may comprise:
means for determining a prevailing temperature of said reducing agent in said container, and
means for determining said cooling requirement of said dosing unit on the basis of said determined prevailing temperature of said reducing agent in said container.

The device may comprise:
means for determining a prevailing temperature of said reducing agent in said dosing unit, and
means for determining said cooling requirement of said dosing unit on the basis of said determined prevailing temperature of said reducing agent in said dosing unit.

The device may comprise:
means for determining said cooling requirement of said dosing unit on the basis of at least one determined parameter chosen from among the following: prevailing ambient temperature of said container, prevailing operating power of an engine of said SCR system, prevailing temperature of exhaust gases in said exhaust duct, and cumulative amount of reducing agent dosed.

The device may comprise:
means for choosing said limit level for reducing agent in said container within a predetermined range.

The device may comprise:
means for continuously determining a cooling requirement of said dosing unit, and
means for choosing an updated limit level for reducing agent in said container on the basis of said continuously determined cooling requirement.

The device may comprise:
means for choosing an initial limit level for reducing agent in a container on the basis of the performance of said SCR system and/or supposed future operation of the SCR system, e.g. as regards estimated average load upon an engine of the SCR system and estimated maximum load upon the engine of the SCR system.

The above objects are also achieved with a motor vehicle which comprises the features of the device of SCR systems which comprise a dosing unit to supply reducing agent to an exhaust duct for exhaust cleaning. The vehicle may be a truck, bus or passenger car.

An aspect of the invention proposes a computer program pertaining to SCR systems which comprise a dosing unit to supply reducing agent to an exhaust duct for exhaust cleaning, and a container for reducing agent, which program contains non-transitory program code stored on a computer-readable medium for causing an electronic control unit or another computer connected to the electronic control unit to perform steps according to the disclosure herein.

An aspect of the invention proposes a computer program product containing a non-transitory program code stored on a non-transitory computer-readable medium for performing method steps according to the disclosure herein when said program is run on an electronic control unit or another computer connected to the electronic control unit.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE DRAWINGS

Figure 1:
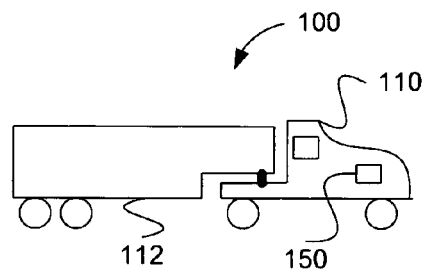
FIG. 1 illustrates schematically a vehicle according to an embodiment of the invention.

FIG. 1 depicts a side view of a vehicle 100. The exemplified vehicle 100 comprises a tractor unit 110 with an engine 150 and a trailer 112. The vehicle may be a heavy vehicle, e.g. a truck or a bus. The vehicle may alternatively be a passenger car.

It should be noted that the invention is applicable to any SCR system and is therefore not restricted to SCR systems of motor vehicles. The innovative method pertaining to SCR systems which comprise a dosing unit to supply reducing agent to an exhaust duct for exhaust cleaning and the innovative device of SCR systems which comprise a dosing unit to supply reducing agent to an exhaust duct for exhaust cleaning according to an aspect of the invention are well suited to platforms which have an SCR system other than motor vehicles, e.g. watercraft. The watercraft may be of any kind, e.g. motorboats, steamers, ferries or ships.

The innovative method and the innovative device according to an aspect of the invention are also well suited to various kinds of power plants, e.g. an electric power plant comprising a diesel generator.

The innovative method and the innovative device are well suited to any engine system which comprises an engine and an SCR system, e.g. on a locomotive or some other platform.

The innovative method and the innovative device are well suited to any system which comprises an $NO_x$ generator and an SCR system.

The term "link" refers herein to a communication link which may be a physical connection such as an opto-electronic communication line, or a non-physical connection such as a wireless connection, e.g. a radio link or microwave link.

The term "line" refers herein to a passage for holding and conveying a fluid, e.g. a reductant in liquid form. The line may be a pipe of any suitable size. The line may be made of any suitable material, e.g. plastic, rubber or metal.

The term "reductant" or "reducing agent" refers herein to an agent used for reacting with certain emissions in an SCR system. These emissions may for example be NOx gas. The terms "reductant" and "reducing agent" are herein used synonymously. Said reductant according to a version is so-called AdBlue. Other kinds of reductants may of course be used. AdBlue is herein cited as an example of a reductant, but specialists will appreciate that the innovative method and the innovative device are feasible with other types of reductants, subject to necessary adaptations, e.g. concerning temperature levels at which functional degradation of a given reductant is initiated, in control algorithms for executing software code in accordance with the innovative method.

Figure 2:
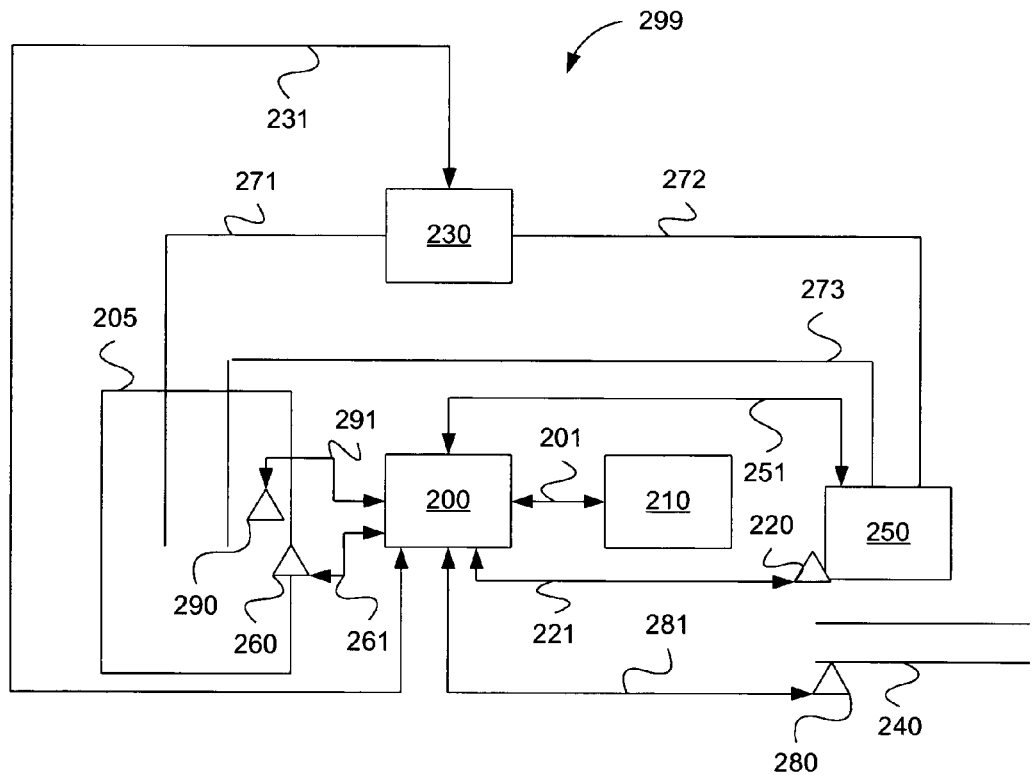
FIG. 2 illustrates schematically a subsystem for the vehicle depicted in FIG. 1, according to an embodiment of the invention.

FIG. 2 depicts a subsystem 299 of the vehicle 100. The subsystem 299 is situated in the tractor unit 110. The subsystem 299 may be part of an SCR system. The subsystem 299 comprises in this example a container 205 arranged to hold a reductant. The container 205 is adapted to containing a suitable amount of reductant and to being replenishable as necessary. The container might accommodate, for example, 75 or 50 litres of reductant.

A first line 271 is adapted to leading the reductant to a pump 230 from the container 205. The pump 230 may be any suitable pump. The pump 230 may be a diaphragm pump provided with at least one filter. The pump 230 is adapted to be driven by an electric motor. The pump 230 is adapted to drawing the reductant from the container 205 via the first line 271 and supplying it via a second line 272 to a dosing unit 250. The dosing unit 250 comprises an electrically controlled dosing valve by means of which an outflow of added reductant can be controlled. The pump 230 is adapted to pressurising the reductant in the second line 272. The dosing unit 250 is provided with a throttle unit against which said pressure of the reductant is built up in the subsystem 299.

The dosing unit 250 is adapted to supplying said reductant to an exhaust duct 240 of an exhaust system (not depicted in its entirety) of the vehicle 100. The exhaust duct 240 is adapted to leading exhaust gases from the engine 150 to surroundings of the SCR system. More specifically, the dosing unit 250 is adapted to supplying a suitable amount of reductant in a controlled way to an exhaust duct 240 of the vehicle 100. According to this version, an SCR catalyst (not depicted) is situated downstream of a location in the exhaust system where the reductant supply is effected. The amount of reductant supplied in the exhaust system is intended to be used in a conventional way in the SCR catalyst to reduce the amount of undesirable emissions in a known way.

The dosing unit 250 is situated adjacent to the exhaust duct 240 which is adapted to leading exhaust gases from the combustion engine 150 of the vehicle 100 to the SCR catalyst. The dosing unit 250 is situated in thermal contact with the exhaust system of the vehicle 100. This means that thermal energy stored in, for example, the exhaust duct 240, silencer and SCR catalyst can thus be led to the dosing unit 250. Reducing agent present in the dosing unit may be warmed therein by said thermal energy.

The dosing unit 250 is provided with an electronic control card which is adapted to handling communication with a control unit 200. The dosing unit 250 comprises also plastic and/or rubber components which might melt or be otherwise adversely affected as a result of too high temperatures.

The dosing unit 250 is sensitive to temperatures above a certain value, e.g. 120 degrees Celsius. As for example the exhaust duct 240, the silencer and the SCR catalyst of the vehicle 100 exceed this temperature value, there is risk that the dosing unit might become overheated during or after operation of the vehicle if not provided with cooling.

It should be noted that reductant present in the dosing unit 250 might be adversely affected by temperatures significantly lower than the 120 degrees Celsius indicated above. At temperatures over, for example, 70 degrees Celsius the reductant might crystallise and hence potentially cause obstruction of the dosing unit 250.

A third line 273 runs between the dosing unit 250 and the container 205. The third line 273 is adapted to leading back to the container 205 a certain amount of the reductant fed to the dosing valve 250. This configuration achieves with advantage cooling of the dosing unit 250. The dosing unit 250 is thus cooled by a flow of the reductant as it is pumped through the dosing unit 250 from the pump 230 to the container 205.

A first control unit 200 is arranged for communication with a first temperature sensor 220 via a link 221. The first temperature sensor 220 is adapted to detect a prevailing temperature of the reducant in the dosing unit 250. The first temperature sensor 220 is adapted to continuously send signals to the first control unit 200 which contain information about a prevailing first temperature T1 of the reductant in the dosing unit 250. The first control unit 200 is adapted to calculate a cooling requirement of the dosing unit 250 on the basis of the signals received from the first temperature sensor 220.

The first control unit 200 is arranged for communication with the pump 230 via a link 231. The first control unit 200 is adapted to control operation of the pump 230 in order for example to regulate the reductant flows within the subsystem 299. The first control unit 200 is adapted to control an operating power of the pump 230 by regulating the associated electric motor.

The first control unit 200 is arranged for communication with a second temperature sensor 280 via a link 281. The second temperature sensor 280 is adapted to detect a prevailing temperature T2 of the exhaust duct 240. The second temperature sensor 280 is adapted to continuously send signals to the first control unit 200 which contain information about a prevailing temperature of the exhaust duct 240. The first control unit 200 is adapted to calculate a prevailing temperature Test of the reductant in the dosing unit 250 on the basis of the signals received from the second temperature sensor 280. The first control unit 200 is adapted to calculate a cooling requirement of the dosing unit 250 on the basis of the signals received from the second temperature sensor 280.

The first control unit 200 is arranged for communication with a third temperature sensor 290 via a link 291. The third temperature sensor 290 is adapted to detect a prevailing temperature T3 of the reducant in the container 205. The third temperature sensor 290 is adapted to continuously send signals to the first control unit 200 which contain information about a prevailing temperature of the reductant in the container 205. The first control unit 200 is adapted to calculate a cooling requirement of the dosing unit 250 on the basis of the signals received from the third temperature sensor 290.

The first control unit 200 is arranged for communication with a level sensor 260 via a link 261. The level sensor 260 is adapted to detect a prevailing volume of the reductant in the container 205. The level sensor 260 is adapted to continuously send signals to the first control unit 200 which contain information about a prevailing volume of the reductant in the container 205. The first control unit 200 is adapted to calculate a cooling requirement of the dosing unit 250 on the basis of the signals received from the level sensor 260.

The first control unit 200 is arranged for communication with the dosing unit 250 via a link 251. The first control unit 200 is adapted to control operation of the dosing unit 250 in order for example to regulate the reductant supply to the exhaust system of the vehicle 100. The first control unit 200 is adapted to control operation of the dosing unit 250 in order for example to regulate the reductant return supply to the container 205.

The first control unit 200 is adapted, according to a version, to use at least one of the signals received from the first temperature sensor 220, the second temperature sensor 280, the third temperature sensor 290 and the level sensor 260 as a basis, for determining a cooling requirement of the dosing unit 250, and to choose a limit level for reducing agent in the container 205 on the basis of said cooling requirement, in accordance with an aspect of the innovative method.

A second control unit 210 is arranged for communication with the first control unit 200 via a link 201. The second control unit 210 may be detachably connected to the first control unit 200. The second control unit 210 may be a control unit external to the vehicle 100. The second control unit 210 may be adapted to perform the innovative method steps according to the invention. The second control unit 210 may be used to cross-load software to the first control unit 200, particularly software for applying the innovative method. The second control unit 210 may alternatively be arranged for communication with the first control unit 200 via an internal network in the vehicle. The second control unit 210 may be adapted to perform substantially similar functions to those of the first control unit 200, e.g. determining a cooling requirement of the dosing unit 250 and choosing a limit level for reducing agent in the container 205 on the basis of said cooling requirement. The innovative method may be applied by the first control unit 200 or the second control unit 210, or by both the first control unit 200 and the second control unit 210.

The subsystem 299 may also comprise a fourth temperature sensor (not depicted) for detecting a prevailing ambient temperature T4 of said container 205 and sending a signal which contains this information to the first control unit 200. The first control unit 200 is adapted to determine a cooling requirement of said dosing unit 250 on the basis of the measured prevailing ambient temperature of the container 205.

The subsystem 299 may also comprise means (not depicted) for determining cumulative amounts of reducing agent dosed and sending a signal containing this information to the first control unit 200. The first control unit 200 is adapted to determine a cooling requirement of said dosing unit 250 on the basis of the determined cumulative amount of reducing agent dosed.

The subsystem 299 may also comprise means (not depicted) for determining a prevailing operating power of an engine 150 of said SCR system and sending a signal containing this information to the first control unit 200. The first control unit 200 is adapted to determine a cooling requirement of said dosing unit 250 on the basis of the determined prevailing operating power of the engine 150 of said SCR system.

Figures 3A, 3B:
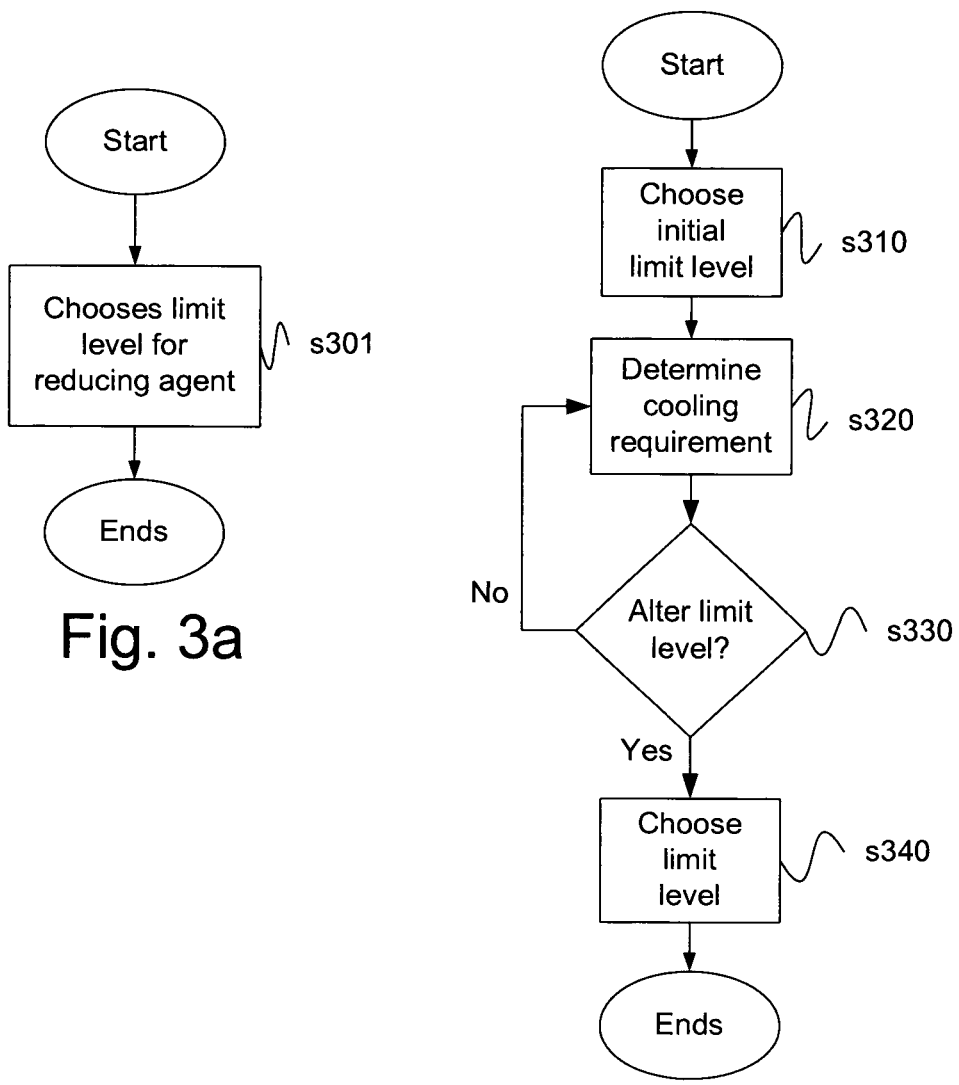
FIG. 3a is a schematic flowchart of a method according to an embodiment of the invention.
FIG. 3b is a more detailed schematic flowchart of a method according to an embodiment of the invention.

FIG. 3a is a schematic flowchart of a method pertaining to SCR systems which comprise a dosing unit to supply reducing agent to an exhaust duct for exhaust cleaning, and a container for reducing agent, according to an embodiment of the invention. The method comprises a first step s301. Method step s301 comprises the step of choosing a limit level for reducing agent in said container. The step s301 comprises the steps of determining a cooling requirement of said dosing unit and choosing a limit level for reducing agent in said container on the basis of said cooling requirement. The method ends after step s301.

FIG. 3b is a schematic flowchart of a method pertaining to SCR systems which comprise a dosing unit to supply reducing agent to an exhaust duct for exhaust cleaning, and a container for reducing agent, according to an embodiment of the invention.

The method comprises a first step s310. Method step s310 comprises the step of choosing an initial limit level for reducing agent in the container 205. This limit level corresponds to a smallest desired residual volume of reducing agent in the container 205. This residual volume may be set on the basis of how the SCR system is supposed likely to be operated. In cases where the SCR system is fitted to a motor vehicle, this residual volume may be set on the basis of the vehicle's type of operation and/or maximum engine power and/or the regional environment in which the vehicle is supposed to be used. The initial limit level for reducing agent in the container 205 may be set at a suitable value, e.g. 5, 10, 15 or 20 litres. Step s310 is followed by a step s320.

Method step s320 comprises the step of determining a cooling requirement of the dosing unit 250. This may be done in various different ways. An example takes into account only a measured temperature of the reducing agent in the container 205. An example takes into account only a measured temperature of the reducing agent in the dosing unit 250. An example takes into account a measured temperature of the reducing agent in the container 205 and a measured temperature of the reducing agent in the dosing unit 250. Another example is that parameters such as prevailing ambient temperature of the container 205, and/or prevailing operating power of the engine 105 of the SCR system, and/or prevailing temperature of exhaust gases in the exhaust duct 240 and/or cumulative amount of reducing agent dosed may be used to determine a cooling requirement of the dosing unit 250. Step s320 is followed by a step s330.

Method step s330 comprises the step of deciding whether the current limit level for reducing agent in the container 205 should be altered. This may be done in various ways. In cases where it is found that the SCR system has run at relatively high power for a certain time and/or that a temperature of the reductant, e.g. in the container 205, has increased to an undesirable level, the limit level for reducing agent may need to be altered to ensure necessary cooling of the dosing unit 250. According to an example, a temperature of the reducing agent in the container 205 should not exceed 50 degrees Celsius, to prevent the reducing agent from becoming functionally degraded and thereafter wholly or partly obstructing the dosing unit 250, even during normal operation.

If it is found that the current limit level for reducing agent in the container 205 should not be altered, method step s320 is performed again. If it is found that the current limit level for reducing agent in the container 205 should be altered, a subsequent step s340 is performed.

Method step s340 comprises the step of choosing on the basis of said cooling requirement a limit level for reducing agent in said container. This limit level may be higher or lower than a current limit level. It should be noted that the innovative method makes it possible to set an optimum limit level for reducing agent in the container 205 for each SCR system.

According to an example, adaptation of a suitable limit level for reducing agent in the container 205 may take a number of days or weeks.

According to an example, a function is also proposed whereby a more short-term adaptation of a suitable limit level for reducing agent in the container 205 is effected in response to temporary changes in the operating situation of the SCR system.

The method ends after step s340.

Figure 4:
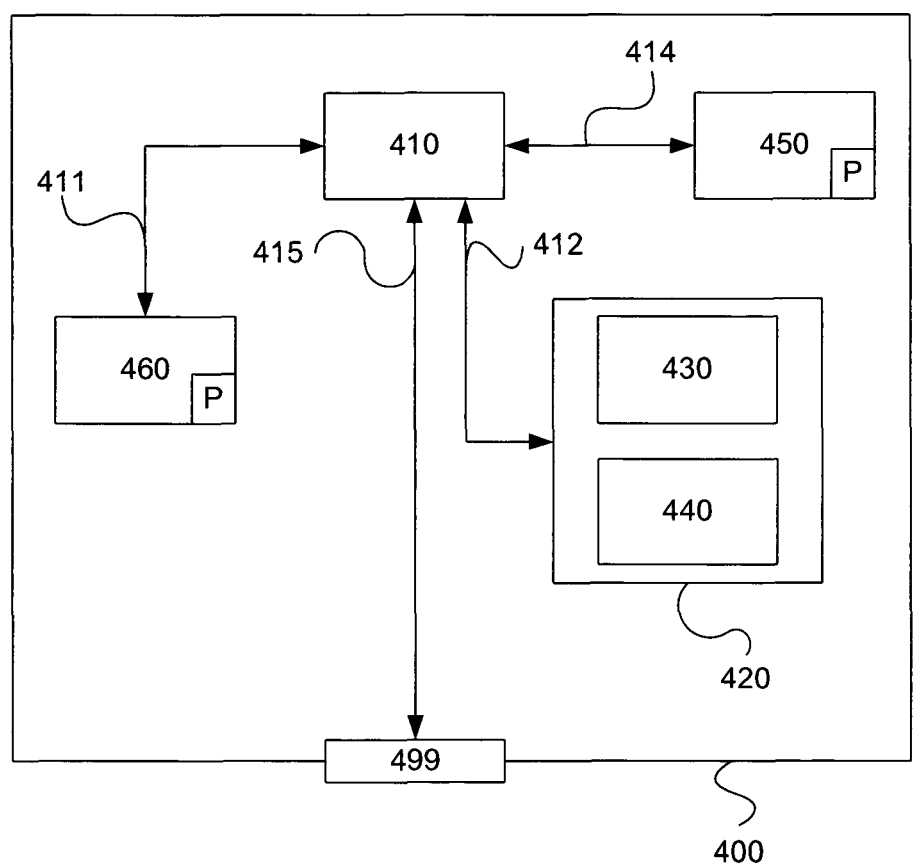
FIG. 4 illustrates schematically a computer according to an embodiment of the invention.

FIG. 4 is a diagram of a version of a device 400. The control units 200 and 210 described with reference to FIG. 2 may in a version comprise the device 400. The device 400 comprises a non-volatile memory 420, a data processing unit 410 and a read/write memory 450. The non-volatile memory 420 has a first memory element 430 in which a computer program, e.g. an operating system, is stored for controlling the function of the device 400. The device 400 further comprises a bus controller, a serial communication port, I/O means, an A/D converter, a time and date input and transfer unit, an event counter and an interruption controller (not depicted). The non-volatile memory 420 has also a second memory element 440.

A proposed computer program P comprises routines for determining a cooling requirement of said dosing unit. The program P comprises routines for determining a prevailing temperature of said reducing agent in said container, and determining said cooling requirement of said dosing unit on the basis of said determined prevailing temperature of said reducing agent in said container. As an alternative or in addition, the program P comprises routines for determining a prevailing temperature of said reducing agent in said dosing unit, and determining said cooling requirement of said dosing unit on the basis of said determined prevailing temperature of said reducing agent in said dosing unit.

The program P comprises routines for determining said cooling requirement of the dosing unit on the basis of at least one determined parameter from among the following: prevailing ambient temperature of said container 205, prevailing operating power of the engine 150 of said SCR system, prevailing temperature of exhaust gases in the exhaust duct 240, and cumulative amount of reducing agent dosed.

The program P comprises routines for choosing a limit level for reducing agent in said container on the basis of said cooling requirement.

The program P may be stored in an executable form or in a compressed form in a memory 460 and/or in a read/write memory 450.

Where the data processing unit 410 is described as performing a certain function, it means that the data processing unit 410 effects a certain part of the program stored in the memory 460, or a certain part of the program stored in the read/write memory 450.

The data processing device 410 can communicate with a data port 499 via a data bus 415. The non-volatile memory 420 is intended for communication with the data processing unit 410 via a data bus 412. The separate memory 460 is intended to communicate with the data processing unit 410 via a data bus 411. The read/write memory 450 is adapted to communicate with the data processing unit 410 via a data bus 414. The data port 499 may for example have the links 201, 221, 231, 251, 281 and 291 connected to it (see FIG. 2).

When data are received on the data port 499, they are stored temporarily in the second memory element 440. When input data received have been temporarily stored, the data processing unit 410 is prepared to effect code execution as described above. According to a version, signals received on the data port 499 contain information about a prevailing temperature of said reducing agent in said container. According to a version, signals received on the data port 499 contain information about a prevailing temperature of said reducing agent in said dosing unit. The signals received on the data port 499 may be used by the device 400 for determining a cooling requirement of the dosing unit 250 and choosing a limit level for reducing agent in said container 205 on the basis of said cooling requirement.

Parts of the methods herein described may be effected by the device 400 by means of the data processing unit 410 which runs the program stored in the memory 460 or the read/write memory 450. When the device 400 runs the program, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method pertaining to an SCR system for an engine which generates exhaust when the engine operates, the engine including an exhaust duct, the engine also comprising a reducing agent dosing unit for supplying a reducing agent to the exhaust duct for exhaust cleaning at the exhaust duct, and a container for receiving reducing agent returned from said dosing unit;
the method comprising:
feeding reducing agent to said dosing unit, and leading back to said container an amount of said reducing agent that had been fed to said dosing unit;
determining a cooling requirement of said dosing unit; and
choosing a limit level for said amount of reducing agent in said container based on said cooling requirement, wherein said limit level for reducing agent in said container corresponds to a smallest desirable volume of reducing agent in said container.

2. The method according to claim 1, further comprising the steps of:
determining a prevailing temperature of said reducing agent in said container; and
determining said cooling requirement of said dosing unit based on said determined prevailing temperature of said reducing agent in said container.

3. The method according to claim 1, further comprising the steps of:
determining a prevailing temperature of said reducing agent in said dosing unit; and
determining said cooling requirement of said dosing unit based on said determined prevailing temperature of said reducing agent in said dosing unit.

4. The method according to claim 1, further comprising the step of:
determining said cooling requirement of said dosing unit based on at least one determined parameter of prevailing ambient temperature of said container, prevailing operating power of said SCR system of said engine, prevailing temperature of exhaust gases in said exhaust duct and cumulative amount of reducing agent dosed.

5. The method according to claim 1, further comprising the step of choosing said limit level for reducing agent in said container within a predetermined range.

6. The method according to claim 1, further comprising the steps of:
continuously determining a cooling requirement of said dosing unit, and choosing an updated limit level of the amount of reducing agent in said container based on said continuously determined cooling requirement.

7. The method according to claim 1, further comprising the step of:
choosing said initial limit level for reducing agent in said container based on performance of said SCR system and/or supposed future operation of said SCR system.

8. The method according to claim 1, in which said reducing agent is a urea-based reducing agent.

9. A computer program product pertaining to an SCR system for exhaust cleaning of an engine, wherein said program product comprises non-transitory program code with non-transitory program instructions for causing a computer system to perform steps according to claim 1 on an electronic control unit or causing another computer connected to the electronic control unit to perform such steps when instructions in said code are run on said computer.

10. A computer program product according to claim 9, wherein said product contains a non-transitory program code stored on a nontransitory computer-readable medium which can be read by said computer system for performing method steps when said computer program is run on an electronic control unit or another computer connected to said electronic control unit.

11. A device of an SCR system for an engine which generates exhaust when the engine operates, the engine including an exhaust duct; the device comprising:
a reducing agent dosing unit for supplying a reducing agent to the exhaust duct for exhaust cleaning at the exhaust duct,
a container for receiving a certain amount of said reducing agent that was fed to said dosing unit and is led back to said container; and
a control unit configured to determine a cooling requirement of said dosing unit and to choose a limit level for reducing agent in said container based on said cooling requirement, wherein said limit level for said reducing agent in said container corresponds to a smallest desirable volume of said reducing agent in said container.

12. The device according to claim 11, further comprising:
a temperature sensor configured to determine a prevailing temperature of said reducing agent in said container; and wherein
the control unit is further configured to determine said cooling requirement of said dosing unit based on said determined prevailing temperature of said reducing agent in said container.

13. The device according to claim 11, further comprising:
a temperature sensor configured to determine a prevailing temperature of said reducing agent in said dosing unit; and wherein
the control unit is further configured to determine said cooling requirement of said dosing unit based on said determined prevailing temperature of said reducing agent in said dosing unit.

14. A device according to claim 11, wherein the control unit is further configured to determine said cooling requirement of said dosing unit based on at least one determined parameter from among prevailing ambient temperature of said container prevailing operating power of said engine of said SCR system, prevailing temperature of exhaust gases in said exhaust duct and cumulative amount of reducing agent dosed.

15. A device according to claim 11, wherein the control unit is further configured to choose said limit level for reducing agent in said container within a predetermined range.

16. A device according to claim 11, wherein the control unit is further configured to continuously determine a cooling requirement of said dosing agent and to choose an updated limit level for reducing agent in said container on the basis of said continuously determined cooling requirement.

17. A device according to claim 11, wherein said reducing agent is a urea-based reducing agent.

18. A device according to claim 11, wherein the control unit is further configured to choose an initial limit level for said reducing agent in said container based on the performance of said SCR system and/or supposed future operation of said SCR system.

19. A device according to claim 18, wherein said performance of said SCR system considers estimated average load upon an engine of the SCR system and estimated maximum load upon the engine of the SCR system.

20. A motor vehicle comprising a device according to claim 11.

21. A motor vehicle according to claim 20, comprising a truck, bus or passenger car.

* * * * *